US010649752B2

(12) United States Patent
Cook et al.

(10) Patent No.: US 10,649,752 B2
(45) Date of Patent: May 12, 2020

(54) SHARING DATA AND APPLICATIONS ACROSS COMPUTING SYSTEMS

(71) Applicant: International Business Machines Corporation, Armonk, NY (US)

(72) Inventors: Alexander Cook, Rochester, MN (US); David M. Koster, Rochester, MN (US); Jason A. Nikolai, Rochester, MN (US); Joseph C. Schmidt, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 27 days.

(21) Appl. No.: 15/278,757

(22) Filed: Sep. 28, 2016

(65) Prior Publication Data

US 2018/0088922 A1 Mar. 29, 2018

(51) Int. Cl.
*G06F 8/61* (2018.01)
*G06F 16/951* (2019.01)
(Continued)

(52) U.S. Cl.
CPC .............. *G06F 8/61* (2013.01); *G06F 16/951* (2019.01); *H04L 67/06* (2013.01); *H04L 67/34* (2013.01);
(Continued)

(58) Field of Classification Search
CPC .. G06F 8/61; G06F 17/30864; G06F 9/44505; G06F 9/45533
(Continued)

(56) References Cited

U.S. PATENT DOCUMENTS 5,524,253 A 6/1996 Pham et al.
9,058,232 B2 * 6/2015 Conover .................. G06F 8/61
(Continued)

FOREIGN PATENT DOCUMENTS

CA 2507255 C * 5/2013 ......... G06F 9/44505
KR 101150019 B1 * 6/2012 ......... G06F 21/6281
WO 2008037857 A1 4/2008

OTHER PUBLICATIONS

Sinha et al., "Candidate Core Selection for Load-Balanced Multicore Shared Tree Multicasting", 2016, IEEE (Year: 2016).*
(Continued)

*Primary Examiner* — Wei Y Zhen
*Assistant Examiner* — Junchun Wu
(74) *Attorney, Agent, or Firm* — Cuenot, Forsythe & Kim, LLC

(57) ABSTRACT

Sharing data among computing systems can include receiving, using a processor, a data transfer event indicating a transfer of a data file from a source system to a target system, querying, using the processor, the source system for an operating system executed by the source system and a file type of the data file, and querying, using the processor, the target system for an operating system executed by the target system. A target application can be determined using the processor. The target application is adapted for execution on the operating system executed by the target system and is adapted for operating on the file type. Installation of the target application on the target system can be initiated. Further, transfer of the data file from the source system to the target system can be initiated using the processor.

17 Claims, 4 Drawing Sheets

(51) Int. Cl.
*H04L 29/08* (2006.01)
*G06F 9/445* (2018.01)
*G06F 9/455* (2018.01)
*H04W 4/50* (2018.01)

(52) U.S. Cl.
CPC ...... *G06F 9/44505* (2013.01); *G06F 9/45533* (2013.01); *H04W 4/50* (2018.02)

(58) Field of Classification Search
USPC ........................................................ 717/174
See application file for complete search history.

(56) References Cited

U.S. PATENT DOCUMENTS

| | | | | |
|---|---|---|---|---|
| 9,183,297 | B1* | 11/2015 | Baker | G06F 16/951 |
| 9,355,415 | B2* | 5/2016 | Anima | G06Q 10/00 |
| 9,378,247 | B1* | 6/2016 | Das | G06F 16/90324 |
| 9,720,668 | B2* | 8/2017 | McGrath | G06F 9/45533 |
| 10,389,850 | B2* | 8/2019 | Fawcett | H04L 67/10 |
| 2003/0093369 | A1* | 5/2003 | Ijichi | G06Q 20/10 |
| | | | | 705/39 |
| 2005/0091674 | A1* | 4/2005 | Knight | G06F 9/4488 |
| | | | | 719/332 |
| 2006/0026587 | A1* | 2/2006 | Lemarroy | G06F 9/4451 |
| | | | | 717/170 |
| 2007/0143446 | A1* | 6/2007 | Morris | G06F 8/61 |
| | | | | 709/219 |
| 2008/0028389 | A1* | 1/2008 | Genty | G06F 8/61 |
| | | | | 717/174 |
| 2010/0076791 | A1* | 3/2010 | Peterson | G06Q 40/06 |
| | | | | 705/4 |
| 2011/0162038 | A1* | 6/2011 | Chunilal | G06Q 10/00 |
| | | | | 726/1 |
| 2012/0117558 | A1* | 5/2012 | Futty | G06F 8/61 |
| | | | | 717/176 |
| 2015/0248282 | A1* | 9/2015 | Zamir | G06F 8/65 |
| | | | | 717/171 |
| 2015/0249673 | A1* | 9/2015 | Niemoeller | H04W 12/08 |
| | | | | 726/4 |
| 2015/0317607 | A1* | 11/2015 | Petrillo | G06F 3/04855 |
| | | | | 705/321 |
| 2016/0300119 | A1* | 10/2016 | Silva | G06F 16/2228 |
| 2017/0024657 | A1* | 1/2017 | Sahu | G06F 16/951 |

OTHER PUBLICATIONS

Tran et al., "Top-k Exploration of Query Candidates for Efficient Keyword Search on Graph-Shaped (RDF) Data", 2009, IEEE (Year: 2009).*

Hristidis et al., "CADS: A Collaborative Adaptive Data Sharing Platform", Aug. 2009, ACM (Year: 2009).*

Pors et al., "Sharing is Caring a Decision Support Model for Multi-Tenant Architectures", Sep. 2013, Utrecht University, The Netherlands. (Year: 2013).*

Henry, A., "Five Best Desktop Music Players," [online] Lifehacker, Sep. 22, 2013, Gizmodo Media Group © 2016, retrieved from the Internet: <http://lifehacker.com/five-best-desktop-music-players-1359017080>, 13 pg.

"Synergy—Mouse and Keyboard Sharing Software," [online] Symless.com [retrieved Sep. 28, 2016] retrieved from the Internet: <http://symless.com/synergy/>, 7 pg.

"VirtualBox" [online] Oracle VM [retrieved Sep. 28, 2016], retrieved from the Internet: <https://www.virtualbox.org/>, 2 pg.

"VMare," [online] VMware, Inc. © 2016 [retrieved Sep. 28, 2016] retrieved from the Internet: <http://www.vmware.com/company.html>, 12 pg.

* cited by examiner

SHARING DATA AND APPLICATIONS ACROSS COMPUTING SYSTEMS

BACKGROUND

This disclosure relates to sharing data across computing systems and managing application installation to facilitate the sharing of data. Computer users typically utilize a plurality of different machines throughout the day whether for work related activities or personal activities. Each of these systems has a particular computing architecture and a particular operating system. The operating systems often vary from one system to another. As such, the set of applications available for execution on a given system typically differs from the set of applications available for execution on another system. When one considers the use of virtualization with each virtual machine being another system, the diversity among systems is even larger.

Users expect to be able to utilize their data across these different systems. Sharing data across these systems, however, is often tedious. Sharing typically requires that the data, e.g., a data file, be copied or moved from a first system to a second system. Depending upon the security in effect, the transfer may require specialized transport mechanisms. Further, particular applications are usually required to interpret data contained in a transferred data file within the second system. The application must be adapted to interpret the particular file type of the data file. In cases where the application needed to interpret the data file is not installed or available, the user has no ability to access the data file on the second system.

SUMMARY

One or more embodiments are directed to methods of sharing data among computing systems. In one aspect, a method can include receiving, using a processor, a data transfer event indicating a transfer of a data file from a source system to a target system, querying, using the processor, the source system for an operating system executed by the source system and a file type of the data file, and querying, using the processor, the target system for an operating system executed by the target system. The method can include determining, using the processor, a target application adapted for execution on the operating system executed by the target system and adapted for operating on the file type. The method can also include initiating installation of the target application on the target system and transfer of the data file from the source system to the target system using the processor.

One or more embodiments are directed to systems for sharing data among computing systems. In one aspect, a system includes a processor configured to initiate executable operations. The executable operations can include receiving a data transfer event indicating a transfer of a data file from a source system to a target system, querying the source system for an operating system executed by the source system and a file type of the data file, querying the target system for an operating system executed by the target system, and determining a target application adapted for execution on the operating system executed by the target system and adapted for operating on the file type. The executable operations can also include initiating installation of the target application on the target system and transfer of the data file from the source system to the target system.

One or more embodiments are directed to a computer program product for sharing data among computing systems. In one aspect, the computer program product includes a computer readable storage medium having program code stored thereon. The program code is executable by a processor to perform a method. The method can include receiving, using the processor, a data transfer event indicating a transfer of a data file from a source system to a target system, querying, using the processor, the source system for an operating system executed by the source system and a file type of the data file, and querying, using the processor, the target system for an operating system executed by the target system. The method can include determining, using the processor, a target application adapted for execution on the operating system executed by the target system and adapted for operating on the file type. The method can also include initiating installation of the target application on the target system and transfer of the data file from the source system to the target system using the processor.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
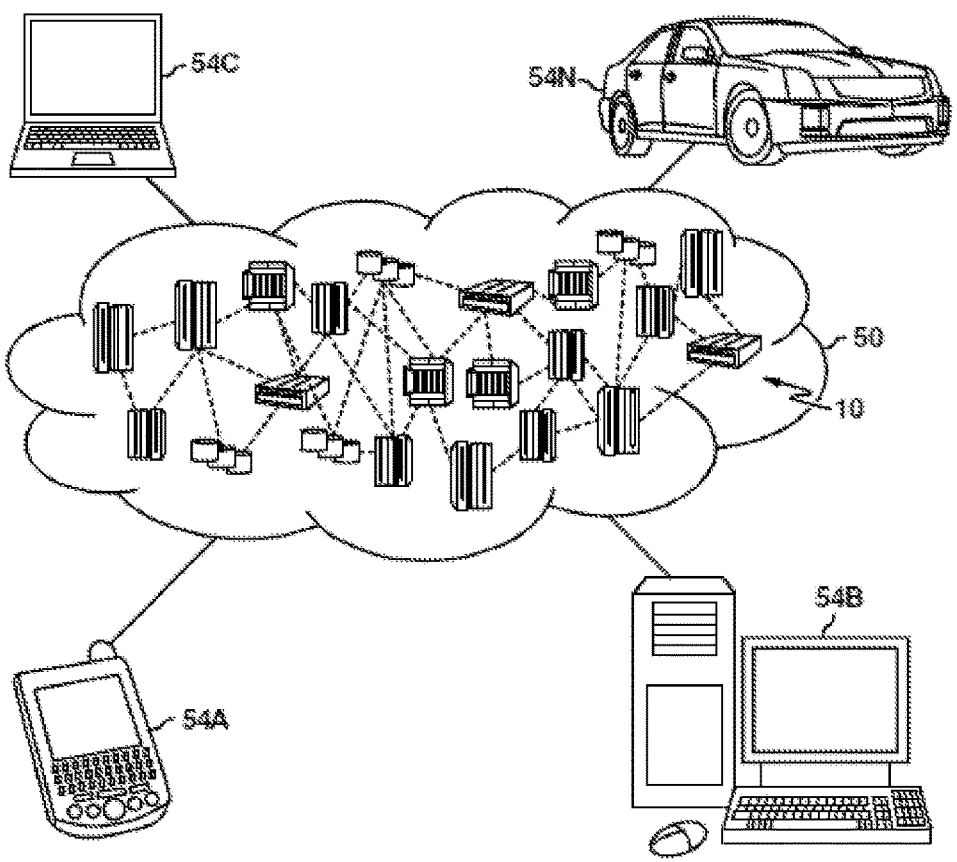
FIG. 1 depicts a cloud computing environment according to an embodiment of the present invention.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to sharing data across computing systems and managing application installation to facilitate the sharing of data. One or more example embodiments described within this disclosure are directed to sharing data and managing installation and/or launch of appropriate applications across homogeneous and/or heterogeneous computing systems. The example embodiments facilitate the ability of a user to utilize and/or operate on data locally within any of a variety of different computing systems using applications adapted for execution in the respective computing system(s). The applications are further adapted for operating on the particular file type of the data being transferred.

In one or more embodiments, the data is transferred from a source system to a target system. Installation management is provided on the target system to ensure that an appropriate application is available for operating on the transferred data. For example, a suitable application needed for operating on the transferred data may be determined and installed on the target system. In one or more embodiments, the application that is installed, referred to herein as a "target application," may comply with one or more requirements of an application installation policy. In one or more embodiments, the transfer of data from the source system to the target system and the installation of the target application within the target system is fully automated. In still other embodiments, user input may be used to direct and/or control selection and/or installation of a target application in the target system.

The example embodiments are described within this disclosure in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
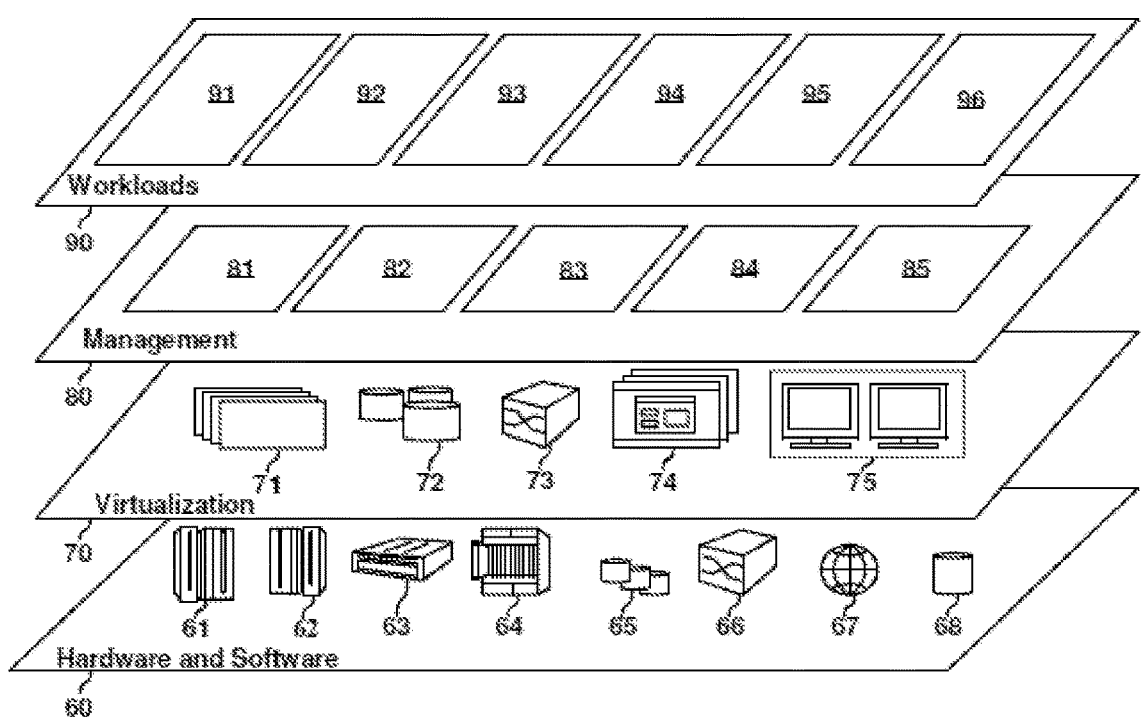
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data sharing and application management (DSAM) 96.

In one or more embodiments, DSAM 96 is capable of transferring data between two or more systems. For example, DSAM 96 is capable of transferring data from a source system to a target system. Further, DSAM 96 is capable of determining the appropriate application, e.g., a target application, for use by the target system to access or otherwise operate on the transferred data. For example, DSAM 96 is capable of determining the target application and initiating installation of the target application within the target system.

In one or more other embodiments, DSAM 96 is capable of configuring the target application once installed within the target system. For example, DSAM 96 is capable of determining a configuration file for the installed target application. Accordingly, DSAM 96 is capable of automatically adjusting one or more settings of the target application installed on the target system based upon the configuration file. The particular settings adjusted may improve operability of the target application on the target system for use with the transferred data.

In one or more other embodiments, DSAM 96 is capable of determining an updated application for use in operating on the transferred data. For example, in some cases, the target system may already have installed therein an application that is adapted to operate on the transferred data. DSAM 96 is capable of consulting one or more data sources to determine whether another target application that is more suitable than the application already installed on the target system is available. If so, DSAM 96 may initiate installation of the suitable target application on the target system.

Figure 3:
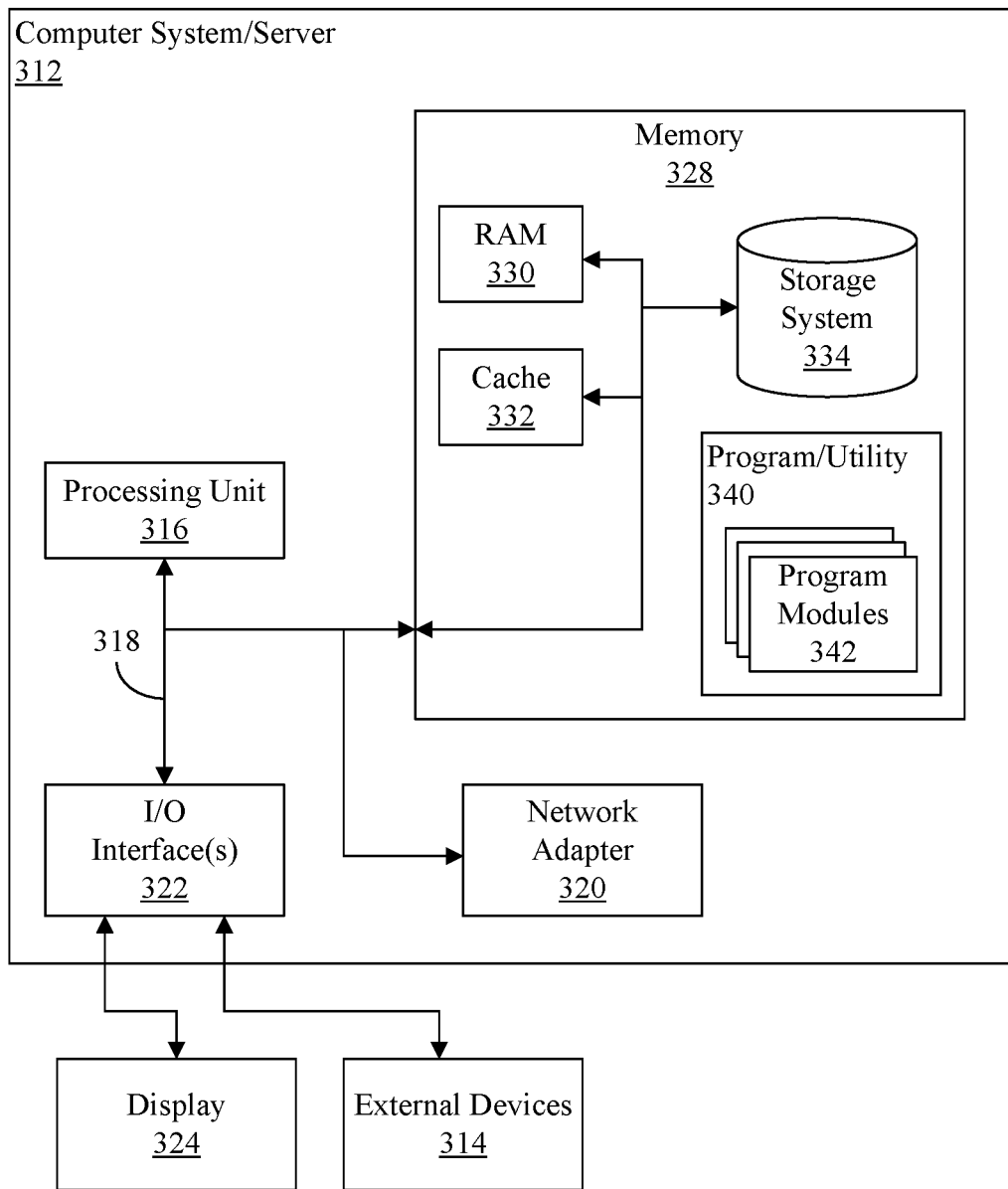
FIG. 3 depicts a cloud computing node according to an embodiment of the present invention.

Referring now to FIG. 3, a schematic of an example of a cloud computing node is shown. Cloud computing node 300 is only one example of a suitable cloud computing node and is not intended to suggest any limitation as to the scope of use or functionality of embodiments of the invention described herein. Regardless, cloud computing node 300 is capable of being implemented and/or performing any of the functionality set forth hereinabove.

Cloud computing node 300 includes a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in cloud computing node 300 is shown in the form of a general-purpose computing device. The components of computer system/server 312 may include, but are not limited to, one or more processors or processing units 316, a system memory 328, and a bus 318 that couples various system components including memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 312 typically includes a variety of computer system readable media. Such media may be any available media that is accessible by computer system/server 312, and it includes both volatile and non-volatile media, removable and non-removable media.

Memory 328 can include computer system readable media in the form of volatile memory, such as random access memory (RAM) 330 and/or cache memory 332. Computer system/server 312 may further include other removable/non-removable, volatile/non-volatile computer system storage media. By way of example, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

For example, one or more of the program modules may include and/or implement DSAM 96 or portions thereof. Program/utility 340 is executable by processing unit 316. Program/utility 340 and any data items used, generated, and/or operated upon by node 300 are functional data structures that impart functionality when employed by node 300. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

While node 300 is used to illustrate an example of a cloud computing node, it should be appreciated that a computer system using an architecture the same as or similar to that shown in FIG. 3 may be used in a non-cloud computing implementation to perform the various operations described herein. In this regard, the example embodiments described herein are not intended to be limited to a cloud computing environment.

Figure 4:
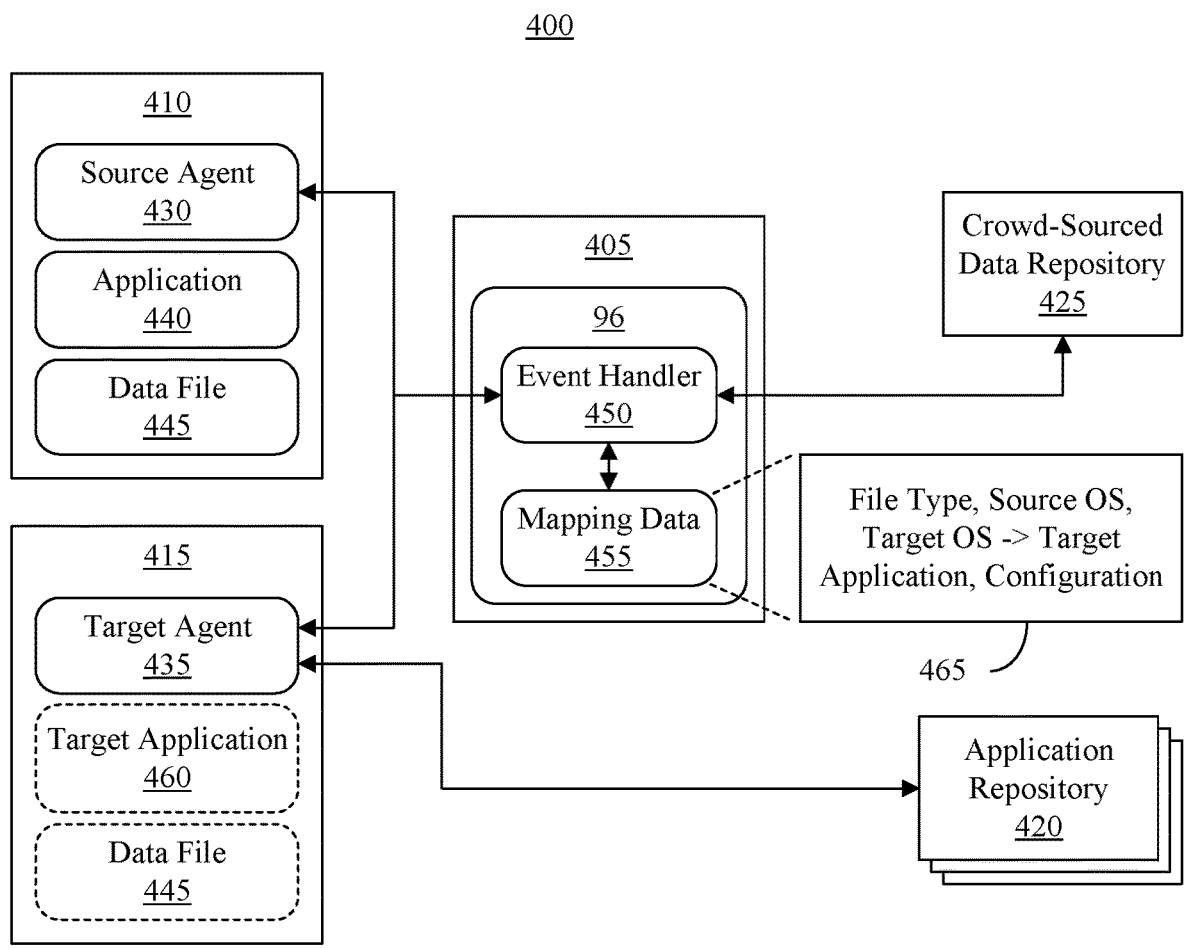
FIG. 4 depicts a network computing environment according to an embodiment of the present invention.

FIG. 4 depicts a network computing environment (environment) 400 according to an embodiment of the present invention. Environment 400 includes a DSAM system 405 executing DSAM 96 therein, a source system 410, and a target system 415. DSAM system 405 may be implemented as a data processing system such as a server, a cloud-computing node, or other computing system. Source system 410 and system 415 may be implemented as data processing systems such as computers (e.g., laptops, personal computers, tablet computing devices), mobile phones such as smart phones, etc.

In one or more embodiments, source system 410 may be implemented as the same type of system as target system 415. For example, source system 410 and target system 415 each may be implemented as a computer, as a mobile device, etc. In one or more embodiments, source system 410 executes a same operating system as target system 415. In one or more other embodiments, source system 410 executes a different operating system than target system 415. For example, source system 410 may be a mobile phone executing a first operating system, while target system 415 is also a mobile phone, but executes a second and different operating system.

In one or more other embodiments, source system 410 and target system 415 may be implemented as different types of systems. For example, source system 410 may be implemented as a laptop computer while target system 415 is implemented as a mobile phone. In that case, source system 410 executes a different operating system than target system 415.

Environment 400 includes one or more application repositories 420 and optionally includes a crowd-sourced data repository 425. Application repository 420 may be implemented as one or more computer systems, Website(s), and so forth that store applications available for installation. Other systems such as target system 415, for example, are capable of accessing application repository 420 and downloading an application for installation therein. Crowd-sourced data repository 425 may be implemented as one or more data processing systems, as a network accessible storage device, and so forth that stores crowd-sourced data to be described herein in greater detail.

Though not illustrated in FIG. 4, DSAM system 405, systems 410 and 415, application repository 420, and crowd-sourced data repository 425 are coupled through a network. The network may include connections, such as wired communication links, wireless communication links, or fiber optic cables. The network may be implemented as, or include, one or more or any combination of different communication technologies such as a Wide Area Network (WAN), a Local Area Network (LAN), a wireless network (e.g., a wireless WAN and/or a wireless LAN), a mobile or cellular network, a Virtual Private Network (VPN), the Internet, the Public Switched Telephone Network (PSTN), and so forth.

As pictured, source system 410 executes a source agent 430; and, target system 415 executes a target agent 435. Agents, such as agents 430 and 435, are capable of monitoring for and detecting predetermined events occurring within the system in which the agents are installed and execute. In one or more embodiments, the events are data transfer events. A data transfer event indicates a request and/or a command to perform an operation such as a move of a data file, a copy of a data file, promotion of a data file to another system, etc. In one or more embodiments, the data transfer event may be detected responsive to a command entered by a user. The command may be received through a command line user interface. In one or more other embodiments, the data transfer event may be detected responsive to a drag and drop operation, where a data file is dragged to an icon representing target system 415. For example, source agent 430 may display an icon for each target system to which a data file may be transferred. The user may drag and drop the data file onto the icon representing the intended target system, e.g., target system 415.

In the example of FIG. 4, source system 410 has application 440 installed therein. Application 440 is adapted to operate on data file 445. The term "operate on," used in reference to an application and a data file, means that the application is able to interpret, read, and/or edit the data file. As an illustrative and non-limiting example, application 440 may be a word processing application and data file 445 may be a word processing document that is readable and/or editable by application 440. In another illustrative and non-limiting example, application 440 may be a spread sheet application and data file 445 may be a spreadsheet file that is readable and/or editable by application 440.

In the example of FIG. 4, DSAM 96, executing within DSAM system 405, includes an event handler 450 and mapping data 455. Event handler 450 is in communication with source agent 430 and/or with target agent 435. In one or more embodiments, source agent 430, responsive to detecting a data transfer event of data file 445 to target system 415, sends a notification to event handler 450.

Event handler 450 is capable of querying source agent 430 and/or target agent 435 to determine items of information to facilitate transfer of data file 445 and/or installation of a target application within target system 415. For example, event handler 450 is capable of querying source agent 430 to determine the operating system executed by source system 410 (the "source OS") and the type of data file being transferred (the "file type"). In another embodiment, event handler 450 is capable of querying source agent 430 for the application installed on source system 410 (the "source application") that is used to operate on data file 445. Event handler 450 is also capable of querying target agent 435 to determine the operating system executed by target system 415 (the "target OS").

The OSs, applications, and file types may be specified with particularity. OSs and applications, for example, may be specified by the particular brand, variety, or model of operating system, version number, build number, and/or date of release and/or update. Similarly, file types may be specified by a particular file format, extension, version number, and/or date.

In the example of FIG. 4, target system 415 does not have an application installed therein that is capable of operating on data file 445. At least initially, target application 460 is not installed within target system 415 and has not even been determined (e.g., has not been identified) for installation within target system 415. Further, data file 445 is not stored within target system 415.

In one or more embodiments, event handler 450 is capable of searching mapping data 455 for an entry that matches the source OS, file type, and target OS. The entries within mapping data 455 specify target applications that are executable on various target OSs and that are adapted to operate designated file types. For example, event handler 450 generates a query specifying the source OS, the file type, and the target OS. In one or more other embodiments, event handler 450 is capable of including the source application in the query as a parameter. The source OS may be the same as the target OS or different from the target OS. The source and target OS may be of entirely different types or different versions of a same or similar OS.

Having located a matching entry within mapping data 455, event handler 450 determines a target application, e.g., target application 460, for installation in target system 415. Event handler 450 may also determine an optional (e.g., if specified) configuration for target application 460. As shown, an example entry 465 of mapping data 455 is illustrated in FIG. 4. In one or more embodiments, entry 465 may include a source application as discussed.

In one or more other embodiments, event handler 450 submits a query to crowd-sourced data repository 425. Crowd-sourced data repository 425 may include entries specifying target applications that are executable on various target OSs and that are adapted to operate on designated file types. The query may specify the source OS, the file type, optionally the source application, and the target OS. As noted, the source OS may be the same as the target OS or different from the target OS. The source and target OS may be of entirely different types or different versions of a same or similar OS.

Crowd-sourced data repository 425 stores entries specifying potential target applications and/or configurations for target applications. Being determined from users and updated in an ongoing basis, crowd-sourced data repository 425 may include different and more recent data than mapping data 455. Event handler 450 may compare the data received from crowd-sourced data repository 425 with the data determined from mapping data 455 and, in the event that the data differs, use the data from crowd-sourced data repository 425. For example, target application 460 may be determined responsive to a query from event handler 450 to crowd-sourced data repository 425.

Responsive to determining or identifying target application 460, event handler 450 sends a message to target agent 435 specifying target application 460 to install. In one or more embodiments, event handler 450 is capable of sending an address such as a URL or the like to target agent 435 specifying a particular application repository 420 from which target application 460 may be downloaded or obtained.

Target agent 435 is capable of accessing application repository 420, downloading target application 460, and installing application 460 within target system 415. In the event that a configuration file is available for target application 460, target agent 435 is capable of changing or adjusting one or more settings of target application 460 once installed within target system 415 based upon the values for settings specified within the configuration file. In one or more other embodiments, the configuration file may specify installation options that may be used to change and/or control the installation of application 460. For example, the configuration file may indicate particular components to be installed (and thus components not to be installed), a particular installer to be used, and so forth.

Event handler 450 may communicate with source agent 430 and/or target agent 435 to facilitate the transfer of data file 445 from source system 410 to target system 415. In one or more embodiments, DSAM 96 is operable to receive data file 445 from source agent 430 and provide data file 445 to target agent 435. In one or more other embodiments, source agent 430 and target agent 435 are operable to establish a peer-to-peer communication link so that data file 445 is provided directly from source system 410 to target system 415.

The example of FIG. 4 illustrates an embodiment in which a user is able to share data and launch appropriate applications across systems with homogeneous and/or heterogeneous operating systems. As defined within this disclosure, the term "heterogeneous" means that the operating system executed by each of at least two systems is different. Accordingly, the term "homogeneous" means that the operating system executed by each of at least two systems is the same. With conventional technologies, when a user wishes to utilize data locally on multiple systems, a mechanism to copy the data to the target system(s) and have one or more applications capable of operating on the transferred data is needed. This is often a tedious task, particularly when a user wishes to utilize a data file on different operating systems or does not have a suitable license to utilize the exact software used on OS of the source system for the OS of the target system.

The inventive arrangements described herein facilitate an improved user experience in a multiple node environment, such as a cloud or cluster, for improved productivity. One or more of the embodiments described herein facilitate the automatic handling of data movement, meeting prerequisites for data movement, application installation, application setup/configuration, and launching of the data file within the appropriate application.

In one or more embodiments, one or more of source system 410 and/or target system 415 may be a cloud-based computing system. For example, source system 410 may be a computer system while target system 415 is a cloud-based instance of a computing system. A user of source system 410 may drag and drop a set of files, e.g., JUnit test cases for use with a JUnit test framework, to an icon representing target system 415. In that case, DSAM system 405, working in combination with target agent 435 is capable of installing and setting up a test environment, e.g., Eclipse, to bring target system 415 up and running in significantly less time than is the case with conventional technology.

Figure 5:
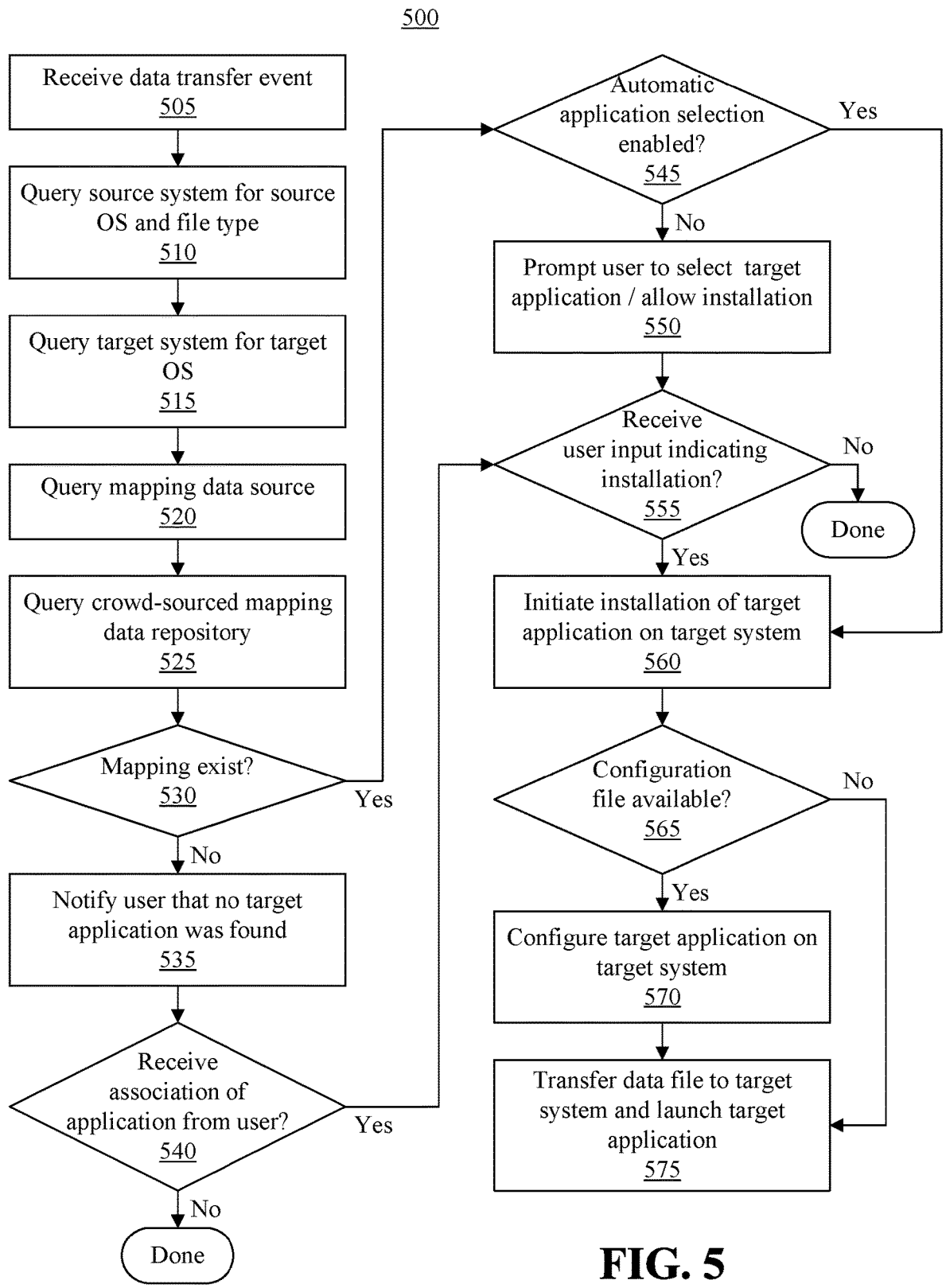
FIG. 5 depicts a method of operation of a system according to an embodiment of the present invention.

FIG. 5 depicts a method 500 of operation of a system according to an embodiment of the present invention. Method 500 may be implemented using a system such as DSAM system 405 of FIG. 4. One or more of the operations described in connection with FIG. 5 may be performed by an agent executing in a source and/or a target system as described in greater detail below. For purposes of clarity, in describing method 500, DSAM system 405 is generally referred to as "the system".

In block 505, the system receives a data transfer event. The data transfer event indicates a request or command to transfer a data file from a source system to a target system. For example, a source agent executing within a source system may detect the data transfer event and send a notification of the data transfer event to the system. The notification may specify the source system and the target system.

As an illustrative example, the source system may execute a Windows® type of operating system and host a Linux® virtual machine (VM). The VM may execute in the physical source system. The VM is the target system in this example. A user may select a data file such as a Microsoft® Word document, drag the data file, and drop the data file on an icon representing the VM. The source agent executing in the source system detects the data transfer event and notifies the system.

In block 510, the system queries the source system for the source OS and the file type for the data that is to be transferred. The system, for example, queries the source agent for the source OS and the file type. As noted, in one or more other embodiments, the system may also query the source system, e.g., the source agent, for the source application installed therein that is used to operate on the data file being transferred. In block 515, the system queries the target system for the target OS. For example, the system queries the target agent for the target OS.

The system may begin looking up the source OS, file type, and target OS within one or more data sources to determine a target application that is executable on the target OS to operate on the data file. If available, the system may also use the source application as part of the query. In block 520, the system queries a mapping data source to determine a target application for installation within the target system. The system, for example, sends a query to the mapping data source specifying the source OS, file type, and target OS. As noted, the system may include the source application within the query. In another embodiment, the system also queries the mapping data source for a configuration for target applications. It should be appreciated that the system may query the mapping data source for a target application and a configuration file for the target application as part of a single query.

As part of the querying, the system receives a response from the mapping data source. The response may indicate a target application, more than one target application, or no target application. As an illustrative example, the system may receive a response to the query submitted to the mapping data source indicating the target application Apache OpenOffice™ may be used to operate on a Microsoft® Word document for the target OS. The response may also indicate whether a configuration is available for the target application.

In block 525, the system queries a crowd-sourced data repository to determine a target application for installation within the target system. The system, for example, sends a query to the crowd-sourced data repository specifying the source OS, file type, and target OS. The system may include the source application within the query. In another embodiment, the system also queries the crowd-sourced data repository for a configuration for target applications. It should be appreciated that the system may query the crowd-sourced data repository for a target application and a configuration file for the target application as part of a single query.

As part of the querying, the system receives a response from the crowd-sourced data repository. The response may indicate a target application, more than one target application, or no target application. As an illustrative example, the system may receive a response to the query directed to the crowd-sourced data repository indicating that a majority of users are utilizing the LibreOffice application to operate on Microsoft® Word documents for the target OS. The response may also indicate whether a configuration is available for the target application.

In one or more embodiments, an application installation policy may be specified within the source system, the target system, or the (DSAM) system. The application installation policy may specify one or more preferences that may be used to modify the query described with reference to block 520 and/or the query described with reference to block 525. These preferences may include attributes that may be added to the query to further refine the target applications that are suitable. In one or more embodiments, the preferences may specify attributes relating to software licensing that are added to the queries. The preferences may specify attributes such as whether the target application should be free, open source, or may be a commercial software package. In one or more embodiments, the preferences may exclude particular target applications from being returned as a result despite the target applications being operable for the target OS and the file type. Target applications may be excluded based upon attributes relating to security, licensing, and so forth.

In block 530, the system determines whether a mapping exists. The system is capable of determining whether one or both of the queries described in connection with blocks 520 and 525 returned a target application as a result. If so, method 500 may proceed to block 550. If not, method 500 may continue to block 535.

Continuing with block 535, the system notifies the user that no target application was found. For example, the system may send a message to the source agent executing in the source system. In response, the source agent may generate a message indicating that no target application was found for the target system.

In block 540, the system determines whether an association of an application is received from the user. For example, in notifying the user that no target application was found, the source agent may generate a user interface querying the user for a particular target application to be used. The source agent may provide any received user input, whether specifying a particular target application to be used or indicating no target application to the system. If the system receives an association of a target application from the user, method 500 continues to block 555. If not, method 500 may end as no suitable target application is determined for installation in the target system for operating on the data file to be transferred. In that case, the transfer of the data file may be terminated.

In block 545, the system determines whether automatic application selection is enabled. In one or more embodiments, enabling automatic application selection allows the system and to automatically initiate installation of the target application on the target system. The target application may be automatically retrieved and installed without user intervention. For example, a user may enable or disable automatic application selection for the target system using the source agent and/or the target agent. The source and/or target agent may propagate the user specified setting to the system. If automatic application selection is enabled, method 500 proceeds to block 560. If automatic application selection is not enabled, method 500 continues to block 550.

In block 550, the system initiates prompting of the user to select a target application. For example, the system, having located an application to be installed in the target system, is capable of notifying the source and/or target agent of the located target application, or applications as the case may be.

In response, the agent may prompt the user to select a target application and/or allow installation. As a further example, the system may notify the source and/or target agent of each candidate application identified from the mapping data source and/or from the crowd source mapping data repository. In response the agent may prompt the user to select a target application and/or allow installation. For example, the agent may present each target application determined as a selectable option (e.g., a candidate target application) available for installation in the target system.

In block 555, the system determines whether user input selecting a target application and indicating installation is received. For example, any user input received via the source and/or target agent may be propagated to the system. If user input selecting an application and indicating installation is received, method 500 continues to block 560. If user input indicating installation is not received, method 500 may end.

As part of the prompting, the system and/or agent may indicate which target applications are preferred in the case where more than one target application is identified. In one or more embodiments, the user may override a recommended application and manually provide input into why the user did not accept the recommended application and auto-installation. The user provided feedback may be incorporated into future recommendations for that user.

In block 560, the system initiates installation of the target application on the target system. In one or more embodiments, the system, whether having automatically determined and selected the target application for installation or determined the target application for installation from a user input, notifies the target agent of the target application to be installed and a location from which to obtain the target application. The system is capable of instructing the target agent to initiate installation of the target application on the target system. In response, the target agent is capable of downloading the target application to the target system. The target agent is capable of installing the target application on the target system.

As discussed, in one or more embodiments, the system uses the application and/or configuration file specified by the crowd-sourced data repository instead of the application and/or configuration file specified by the mapping data source. Referring to the prior example, the system may select LibreOffice for installation over OpenOffice™. In one or more other embodiments, as noted, the system may initiate a query to the user as to which target application to install.

In one or more embodiments, the target agent is capable of installing the target application using any of a variety of known installers for the target OS. In one or more other embodiments, the particular installer to be used for the target application may be determined from the mapping data source and/or from the crowd-sourced mapping data repository.

In one or more embodiments, where automatic application selection is enabled, the system is capable of automatically initiating the installation of the target application. In cases where more than one target application is available, whether from the mapping data source, the crowd-sourced mapping data repository, or both, the system is capable of selecting the target application from the plurality of candidate target applications for installation automatically. In one or more embodiments, the system is capable of performing sentiment analysis on user comments, messages, posts, sentiment indicators, or other textual data included in, or associated with, the entries of the mapping data source and/or crowd-sourced mapping data repository.

In one or more embodiments, the system is capable of performing Natural Language Processing (NLP) to implement sentiment analysis. NLP is a field of computer science, artificial intelligence and linguistics which implements computer processes to facilitate interactions between computer systems and human (natural) languages. NLP enables computers to derive computer-understandable meaning from natural language input. The International Organization for Standardization (ISO) publishes standards for NLP, one such standard being ISO/TC37/SC4. As part of NLP, semantic analysis may be performed. Semantic analysis may follow parsing and involve extraction of context-independent aspects of a sentence's meaning, including entities, named entities, the semantic roles of entities mentioned in the sentence, and quantification information, such as cardinality, iteration, and dependency.

In the case where more than one target application is identified, the system, using NLP, is capable of ranking the target applications through an analysis of posts, messages, "likes" or other indicators of emotional sentiment, and so forth. In the context of the mapping data source and/or crowd-sourced mapping data repository, the posts, messages, likes, and such are programmatic actions that are monitored and persisted within a data processing system, e.g., a social the networking system or the like that includes or is coupled to the aforementioned data sources and/or data repositories. The system may generate a score based upon positive sentiment, e.g., where the score is increased for each positive sentiment found for a given target application, negative sentiment, e.g., where the score is reduced for each negative sentiment found for the given target application, and so forth.

In block 565, the system determines whether a configuration for the target application is available. If so, the DSAM is capable of notifying the target agent of the configuration file and where to obtain the configuration file. In one or more other embodiments, configuration files may be stored with, or in association with, applications within the application repository. Accordingly, in notifying the target agent of the location of the target application, the target agent is capable of determining whether the application has a configuration file associated therewith by way of querying the application repository. Responsive to determining that a configuration file is available, method 500 continues to block 570. Responsive to determining that a configuration file is not available, method 500 proceeds to block 575.

In one or more embodiments, the particular installer to be used to install the application is specified within the configuration file. In that case, the configuration file may be downloaded with the application. The target agent is capable of determining the appropriate installer for the application by first reading the configuration file prior to installing the application.

In block 570, the target agent configures the application on the target system. For example, the target agent is capable of downloading the configuration file for the application. With the target application installed, the target agent may update and/or change one or more settings for the target application based upon the values for the settings stored within the configuration file. As an illustrative example, the configuration file may indicate that a setting that turns on a particular compatibility mode of the target application should be turned on. Accordingly, the target agent may turn on the compatibility mode in the target application.

In block 575, the system initiates transfer of the data file from the source system to the target system. For example, the system is capable of instructing the source agent to begin transmitting the data file. In one or more embodiments, the source agent transfers the data file from the source system to the (DSAM) system, which transfers the file to the target agent in the target system. In one or more other embodiments, the source agent may establish a peer-to-peer communication link with the target agent and transfer the data file over the peer-to-peer communication link.

The system is capable of automatically launching the target application with the data file within the target system. With the application installed on the target system, the target application is associated with the file type of the transferred data file within the target OS. The target agent may launch the application and load the transferred data file.

In one or more embodiments, the association of the file type of the transferred data file with the newly installed target application may apply across all applications and same file types within the target OS. In one or more other embodiments, the association of the file type of the transferred data file with the newly installed target application may be specific to the transferred file only or specific to data files of the same file type as the data file transferred in block 580 that are also transferred from a source system. For example, the target agent may track which files have been transferred as described herein as well as the preference for whether the newly installed target application is to be used to open only the transferred file, only transferred data files of the same file type, or for all data files of the same file type on the target system regardless of whether such data files were transferred from a source system.

In one or more embodiments, the source agent and/or the target agent is capable of providing a user interface for receiving user input indicating feedback for the application installed on the target system. Received user input may be propagated from the relevant agent to the system for analysis. In one or more embodiments, the system is capable of performing NLP on received user feedback to rank the target application. The analysis may be performed on comments received from the user to determine whether a certain target application works "well" for certain application types and OSs. The user may also specify sentiment using "stars" or other sentiment indicators that the system may use to rank or score the target application.

In still another embodiment, the target agent is capable of tracking whether the application installed in block 560 is later uninstalled from the target system. Detecting that the target application is uninstalled on the target system may reduce the desirability of the target application or lower the rank of the target application. The target agent may notify the system that the target application has been uninstalled from the target system. Accordingly, the system may lower the score or rank of the target application responsive to being notified that the target application was uninstalled. Accordingly, in cases where two or more applications may be used, the target application that is uninstalled more often may be ranked lower than the other target application. Given the choice of two or more target applications that may be used, the system may select the application with fewer uninstalls.

In one or more other embodiments, the system and/or the agents are capable of monitoring for the availability of a further application that is rated higher than the application installed on the target system. Responsive to determining that another application is available with the higher rating, the system may query the target system via the target agent as to whether to install the higher rated application. Responsive to an affirmative response, the system may initiate installation of the higher rated application on the target system. The prior application may or may not be uninstalled depending upon user preference or a user response to a query.

In one or more other embodiments, the system is capable of downloading the target application and/or the configuration file and providing such items to the target agent. In that case, the target agent need not be provided with the target application and/or a location as the target application and any configuration for the target application is provided directly from the (DSAM) system. Further, in providing the configuration file to the target agent, the system is capable of instructing the target agent to adjust settings of the target application based upon the provided configuration file.

One or more embodiments described herein are directed to methods, systems, and/or computer program products including computer readable storage media that facilitate utilization of a first file by a user. A user may have a first file, stored according to a first file format, which may be opened by any one of a plurality of first format file opening programs, where each of the first format file opening programs is capable of opening files stored according to the first file format. First file format opening data can be received, where the first file format opening data is indicative of a manner in which users open and/or prefer to open files saved according to the first file format. A user interface that includes a first file opening indication mechanism that allows a user to indicate a desire to open the first file can be provided on and through a computer device. A user input may be received through the first file opening mechanism (e.g., the first file opening indication mechanism) that indicates a first user's desire to open the first file. Responsive to the receipt of the user input, the first file may be opened in a manner that is based, at least in part, upon the first format file opening data.

In one or more embodiments, the opening of the first file is informed by the first format file opening data by automatically, and without requiring the first user to make a choice, opening the first file by a first program of the plurality of first format file opening programs which is indicated as optimal by the first format file opening data.

In one or more embodiments, first user preference data indicative of preferences of the first user with respect to opening files can be received. The first file may be opened in a manner that is further based, at least in part, upon the first user preference data.

In one or more embodiments, the first user preference data relates to an open source status of file opening programs.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "plurality" means two or more than two.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The terms first, second, etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of sharing data among computing systems, comprising:
receiving, using a processor, a data transfer event indicating a transfer of a data file from a source system to a target system;
querying, using the processor, the source system for an operating system executed by the source system and a file type of the data file;
querying, using the processor, the target system for an operating system executed by the target system;
identifying a plurality of different candidate target applications that are each adapted for:
executing on the operating system executed by the target system, and
operating on the file type;
selecting, using the processor and from the plurality of different candidate target applications, a selected target application; and
initiating installation of the selected target application on the target system and transfer of the data file from the source system to the target system using the processor, wherein
the application installation policy specifies a preference used to identify the plurality of different candidate target applications, and
the preference modifies a query used to perform the identifying.

2. The method of claim 1, wherein
the selected target application is determined from crowd-sourced data specifying applications executable by different operating systems for the file type.

3. The method of claim 1, further comprising:
determining a configuration file specifying a setting for the selected target application when installed on the operating system executed by the target system.

4. The method of claim 3, further comprising:
automatically adjusting the setting of the target application installed on the target system based upon the configuration file.

5. The method of claim 1, wherein
the operating system executed by the target system is different from the operating system executed by the source system.

6. The method of claim 1, wherein
the target system is a virtual machine executing in the source system or another data processing system.

7. A system for sharing data among computing systems, comprising:
a processor configured to initiate executable operations including:
receiving a data transfer event indicating a transfer of a data file from a source system to a target system;
querying the source system for an operating system executed by the source system and a file type of the data file;
querying the target system for an operating system executed by the target system;
identifying a plurality of different candidate target applications that are each adapted for:
executing on the operating system executed by the target system, and
operating on the file type;
selecting, from the plurality of different candidate target applications, a selected target application; and
initiating installation of the selected target application on the target system and transfer of the data file from the source system to the target system, wherein
the application installation policy specifies a preference used to identify the plurality of different candidate target applications, and
the preference modifies a query used to perform the identifying.

8. The system of claim 7, wherein
the selected target application is determined from crowd-sourced data specifying applications executable by different operating systems for the file type.

9. The system of claim 7, wherein
the processor is configured to initiate executable operations further including:
determining a configuration file specifying a setting for the target application when installed on the operating system executed by the target system.

10. The system of claim 9, wherein
the processor is configured to initiate executable operations further including:
automatically adjusting the setting of the selected target application installed on the target system based upon the configuration file.

11. The system of claim 7, wherein
the operating system executed by the target system is different from the operating system executed by the source system.

12. The system of claim 7, wherein
the target system is a virtual machine executing in the source system or another data processing system.

13. A computer program product for sharing data among computing systems, the computer program product comprising
a computer readable storage medium having program instructions embodied therewith, the program instructions executable by a processor to cause the processor to perform a method comprising:
receiving, using the processor, a data transfer event indicating a transfer of a data file from a source system to a target system;
querying, using the processor, the source system for an operating system executed by the source system and a file type of the data file;
querying, using the processor, the target system for an operating system executed by the target system;
identifying a plurality of different candidate target applications that are each adapted for:
executing on the operating system executed by the target system, and
operating on the file type;
selecting, using the processor and from the plurality of different candidate target applications, a selected target application; and
initiating installation of the selected target application on the target system and transfer of the data file from the source system to the target system using the processor,
wherein
the application installation policy specifies a preference used to identify the plurality of different candidate target applications, and
the preference modifies a query used to perform the identifying.

14. The computer program product of claim 13, wherein the selected target application is determined from crowd-sourced data specifying applications executable by different operating systems for the file type.

15. The computer program product of claim 13, wherein the program instructions are executable by the processor to cause the processor to initiate operations comprising: determining a configuration file specifying a setting for the target application when installed on the operating system executed by the target system.

16. The computer program product of claim 15, wherein the program instructions are executable by the processor to cause the processor to initiate operations comprising: automatically adjusting the setting of the selected target application installed on the target system based upon the configuration file.

17. The computer program product of claim 13, wherein the operating system executed by the target system is different from the operating system executed by the source system.

* * * * *